United States Patent [19]
Honda et al.

[11] Patent Number: 5,651,132
[45] Date of Patent: Jul. 22, 1997

[54] DISK ARRAY CONTROL SYSTEM

[75] Inventors: Kiyoshi Honda; Takashi Oeda; Naoto Matsunami; Hiroshi Arakawa, all of Yokohama; Minoru Yoshida, Odawara, all of Japan

[73] Assignee: Hitachi, Ltd., Tokyo, Japan

[21] Appl. No.: 199,838

[22] Filed: Feb. 22, 1994

[30] Foreign Application Priority Data

Mar. 8, 1993 [JP] Japan ................... 5-046786

[51] Int. Cl.⁶ .................................. G06F 11/00
[52] U.S. Cl. ............... 395/441; 395/440; 395/182.04; 364/738; 371/49.4
[58] Field of Search ..................... 395/441, 405, 395/440; 371/40.1, 4.94; 364/738

[56] References Cited

U.S. PATENT DOCUMENTS

| 4,761,785 | 8/1988 | Clark et al. |
|---|---|---|
| 5,353,424 | 10/1994 | Partovi et al. ............. 395/405 |
| 5,373,128 | 12/1994 | Menon et al. ............. 371/40.1 |
| 5,410,667 | 4/1995 | Belsan et al. ............. 395/441 |
| 5,418,921 | 5/1995 | Cortney et al. ............. 395/440 |
| 5,469,548 | 11/1995 | Callison et al. ............. 395/441 |

FOREIGN PATENT DOCUMENTS 4-245352  9/1992  Japan.

OTHER PUBLICATIONS

Lee, Edward K., et al. "Performance Consequences of Parity Placement in Disk Arrays," Computer Science Division, Electrical Engineering Computer Science, University of California at Berkeley, Apr. 1991, pp. 190–199 (English).

Primary Examiner—Jack B. Harvey
Assistant Examiner—David A. Wiley
Attorney, Agent, or Firm—Fay, Sharpe, Beall, Fagan, Minnich & McKee

[57] ABSTRACT

In a computer system utilizing an array disk for an external storage device, an array controller arranged between a host computer and disk unit group has a main controller for controlling the array disk; a buffer for temporarily buffering data transferred between the host computer and the disk units; a parity data generator for generating parity data; and an interface controller for controlling interfaces connecting the host computer with the disk units. The buffer has memories for storing transfer requested data and parity data as previous data and previous parity data, respectively. The array controller also has memory management information for managing the memories.

21 Claims, 9 Drawing Sheets

BLOCK DIAGRAM OF COMPUTER SYSTEM ACCORDING TO FIRST EMBODIMENT

BLOCK DIAGRAM OF COMPUTER SYSTEM ACCORDING TO FIRST EMBODIMENT

FLOW DIAGRAM OF READ PROCESSING IN FIRST EMBODIMENT

FLOW DIAGRAM OF WRITE PROCESSING IN FIRST EMBODIMENT

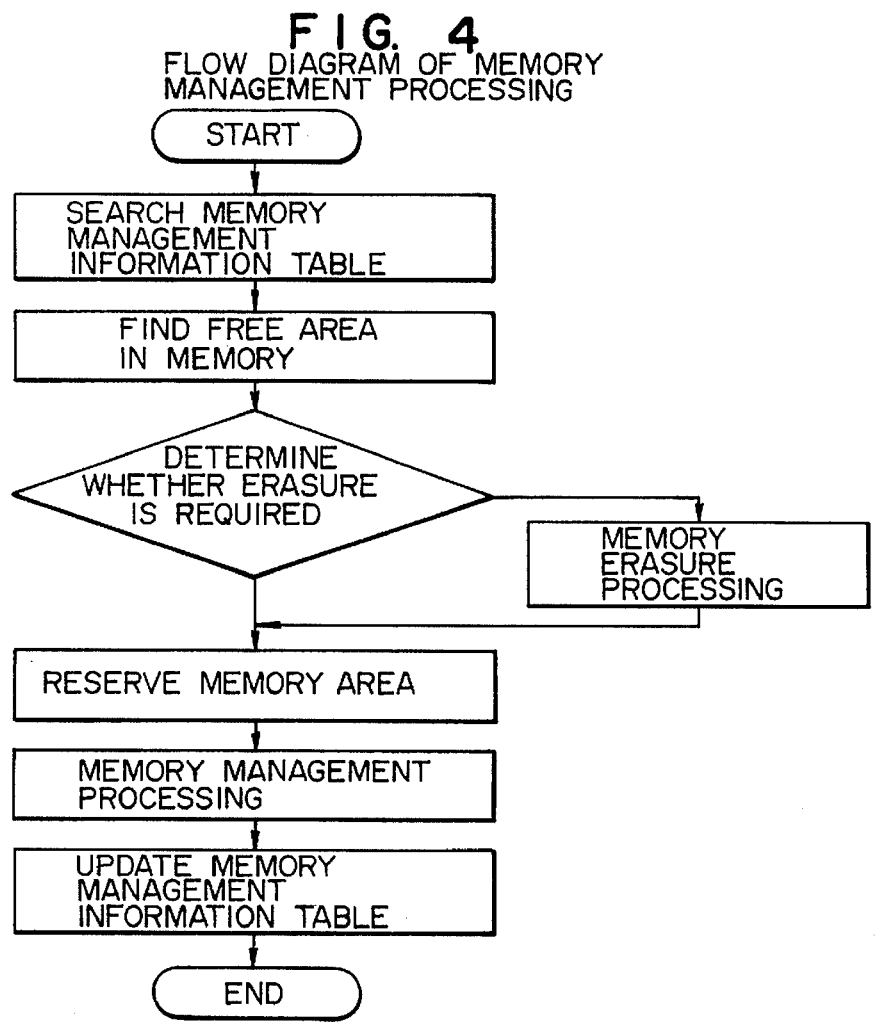

BLOCK DIAGRAM OF COMPUTER SYSTEM ACCORDING TO SECOND EMBODIMENT

BLOCK DIAGRAM OF COMPUTER SYSTEM
ACCORDING TO THIRD EMBODIMENT

BLOCK DIAGRAM OF COMPUTER SYSTEM ACCORDING TO FOURTH EMBODIMENT

BLOCK DIAGRAM OF COMPUTER
SYSTEM ACCORDING TO FIFTH EMBODIMENT

BLOCK DIAGRAM OF COMPUTER SYSTEM ACCORDING TO SIXTH EMBODIMENT

DISK ARRAY CONTROL SYSTEM

BACKGROUND OF THE INVENTION

The present invention relates to a control system for a disk array which has a plurality of disk units arranged in an array form used as an external storage device for a computer system, and more particularly to a control system for optimizing parity data update processing.

As a disk system comprising a plurality of disk units, Edward K. Lee and Randy H. Katz of University of California at Barkeley have proposed, in an article, an architecture of a disk system which is provided with a parallel interface for each of disk units so as to allow the disk units to simultaneously send a plurality of I/O requests to the interfaces, thus achieving a fast-access and large scale disk system.

Also, for a disk unit access system at "level 4, 5" according to the classification of disk arrays into five levels, it has been known, for example, that parallel read accesses are achieved at level 4, whereas, since a write access requires read modify write processing (RMW processing) to be performed on previous data including parity data, the level 4, which assigns parity data to a single disk unit, limits only one write access request from a host computer to a disk array". Thus, "level 4, 5" for controlling accesses to disk units in striping size units has a problem that the RMW processing should be executed the fastest possible. According to the above-mentioned article published from the University of California at Barkeley entitled "Performance Consequences of Parity Placement in Disk Arrays", two systems are proposed for realizing a parity data update processing system (RMW processing system).

However, since the above-mentioned prior art requires the data read/write processing for reading data from and writing data into disk units when parity data is to be updated, the performance of the whole system is limited by the disk access capability.

Further, U.S. application Ser. No. 07/827,982 corresponding to JP-A-4-245352 discloses a storage unit control method and a storage unit sub-system for speeding-up of write processing to an array type disk system.

SUMMARY OF THE INVENTION

The prior art merely teaches a system which has a cache within an array disk system but does not disclose management of the cache performed on the host computer side. If a cache provided within an array disk system is managed on the host computer side, unfavorable double management of cache may result. Further, since the above-mentioned prior art system assumes that the host computer executes write-after processing, the cache region must be composed of non-volatile memory elements (for example, battery back-upped RAM, EEPROM, or the like), which possibly leads to a higher cost. Further, for asynchronous execution of processing associated with the generation of new parity data, the prior art does not cope with a drawback that such asynchronous execution is limited only after detection of a data write request from the host computer.

Therefore, a technical subject matter of the present invention is to solve the problems inherent to the above-mentioned prior art, and it is an object of the present invention to provide an information processing system having a host computer and a plurality of disk units which realizes array control and cache management on the host computer side so as to enable uniform management of the cache; and use at least part of a main memory region of the host computer as the cache region to consequently reduce the cost of the information processing system.

It is another object of the present invention to restrict data to be cached so as to realize the information processing system at a lower cost even if the cache region is composed of volatile memory elements.

It if a further object of the present invention to enable read processing associated with generation of parity data to be executed immediately after detection of a data read request from the host computer in order to improve the freedom with respect to opportunities of executing the read processing, thereby optimizing the parallel processing which is the feature of the array disk system.

To achieve the above objects, a computer system employing an array disk according to the present invention as an external storage device comprises a host computer; an array controller; and a group of disk units. The array controller is formed of a main controller for controlling the array disk; a buffer for temporarily buffering data to be transferred between the host computer and a disk unit; a parity data generator for generating parity data; and an interface controller for individually controlling interfaces for connecting the host computer and the respective disk units. The buffer is configured to have memories for storing transfer requested data and parity data as previous data and previous parity data, respectively.

The main controller in the array controller has means (function) for detecting a data transfer request from the host computer; means (function) for finding a disk unit which contains transfer requested data and parity data corresponding to the transfer request data and for mapping address information; means (function) for generating and sending a data transfer request to the found disk unit; and means (function) for storing transfer requested data and parity data into the memories as previous data and previous parity data and for managing the stored data. The parity data generator in the array controller has a function of generating new parity data from the transfer requested data, previous data and previous parity data. The main controller in the array controller, upon detecting a data read request from the host computer, generates and sends a data read request to one or a plurality of disk units which contain transfer requested data and parity data corresponding to the transfer requested data, transfers the transfer requested data read from the disk unit to the host computer, and simultaneously stores the data (transfer requested data and parity data) read from the disk unit(s) to the memories. Then, by generating parity data from the data previously stored in the memories by the data read request as described above and the transfer requested data from the host computer, a read access conventionally sent to a disk unit for generating new parity data is made unnecessary, thus realizing faster write processing in an array disk.

Also, in the present invention, since memory management information is generated for managing the memories in the buffer so that the array controller can manage the memories, processing for writing transfer requested data and processing for writing parity data can be asynchronously realized, thereby permitting optimal multiple processing to be performed even in the write processing performed for an array disk.

Also, according to the present invention, since memory management information is generated for managing the memories in the buffer so that the array controller can manage the memories, the memories can be searched even when a data read request from the host computer is detected, whereby data in conformity to transfer requested data, if exists in the memories, can be immediately transferred, thus enabling faster read processing to be performed for an array disk.

The array controller, upon detecting a data read request from the host computer, generates and sends a data read request to a predetermined disk unit which contains transfer requested data and parity data corresponding to the transfer requested data. Then, the array controller transfers the transfer requested data transferred thereto from the disk unit to the host computer and simultaneously stores the transfer requested data and the parity data corresponding to the transfer requested data in the memories in the buffer provided in the array controller as previous data and previous parity data. By generating new parity data from the previously read data stored in the memories by the data read request and the transfer requested data from the host computer, a read access to a disk unit conventionally generated for parity data update processing is made unnecessary, thus achieving faster write processing in an array disk.

Specifically, the buffer in the array controller temporarily buffers data transferred between the host computer and a disk unit, and the memories in the buffer stores transfer requested data and parity data as previous data and previous parity data. The parity data generator generates new parity data from the transfer requested data and previous data. Then, each interface controller controls the interface for connecting the host computer with a disk unit.

The main controller in the array controller totally controls the array disk. Specifically, the main controller, when detecting a data transfer request from the host computer, finds a disk unit which contains transfer requested data and parity data corresponding to the transfer requested data, and maps address information for the found disk unit. The main controller, when detecting a data read request, generates and sends a data read request to the disk unit, stores transfer requested data and parity data from the disk unit in the memories as previous data and previous parity data and manages the stored data. On the other hand, when detecting a data write request, the main controller executes a search in the memories, and has the parity data generator execute processing for generating new parity data from the previous data, the previous parity data and the transfer requested data from the host computer.

BRIEF DESCRIPTION OF THE DRAWINGS

The present invention will be more apparent from the following detailed description, when taken in conjunction with the accompanying drawings, in which;

FIG. 4 is an explanatory diagram showing a memory management processing flow according to the first embodiment of the present invention;

FIG. 5 shows an example of a memory management table according to the first embodiment of the present invention;

DESCRIPTION OF THE PREFERRED EMBODIMENTS

The present invention will hereinafter be described in connection with preferred embodiments thereof with reference to FIG. 1 to FIG. 10.

Figure 1:
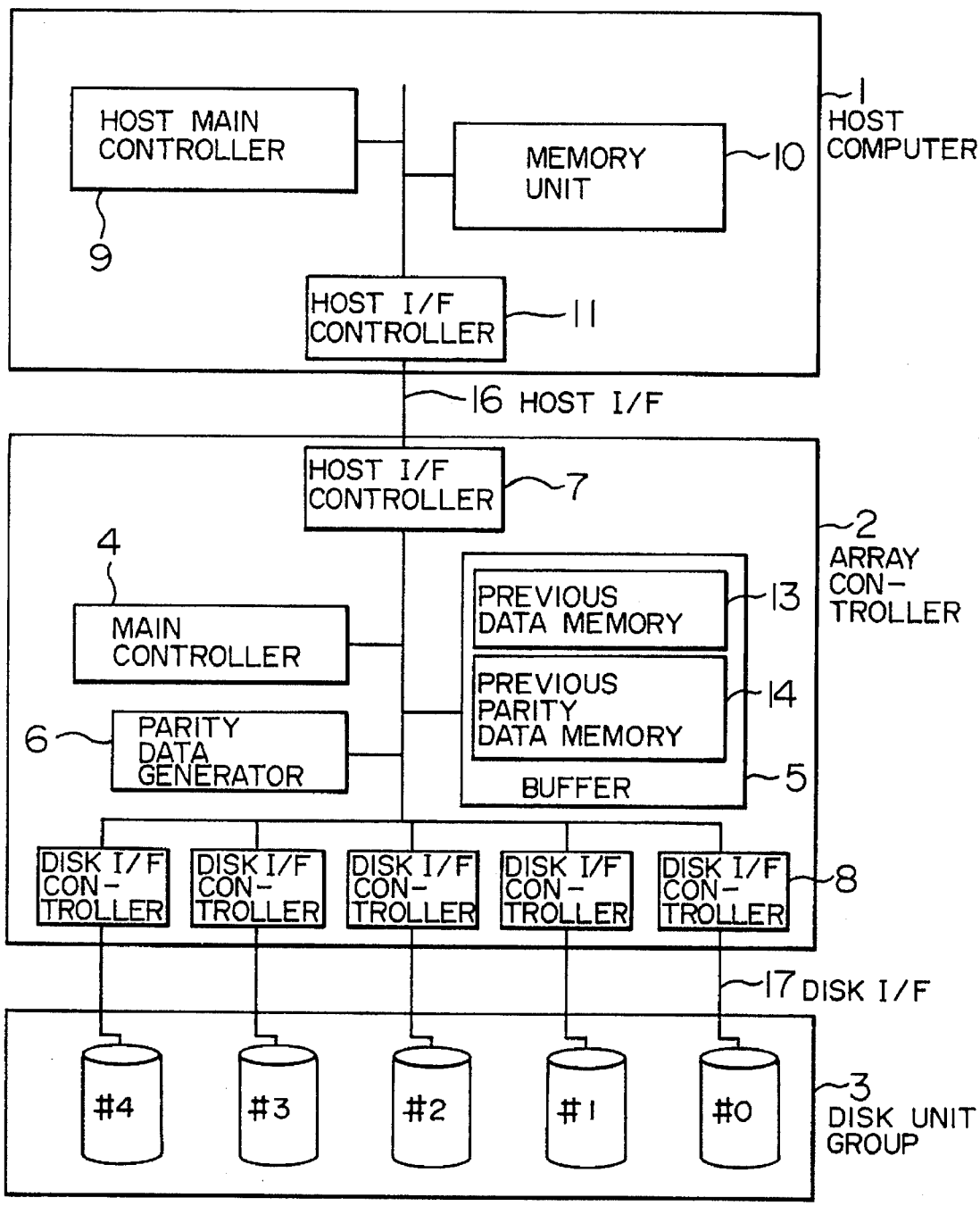
FIG. 1 is a block diagram showing a computer system to which a first embodiment of the present invention is applied.

FIG. 1 shows in block diagram form a computer system which employs an array disk as an external storage device according to a first embodiment of the present invention. In particular, the computer system of this embodiment is constructed to cache transfer requested data from a host computer and parity data corresponding to this transfer requested data in an array controller for controlling the array disk.

Referring first to FIG. 1, a host computer 1 comprises a host main controller 9; a memory unit 10; and a host interface controller 11. An array controller 2 comprises a main controller 4; a buffer 5; a parity data generator 6; a host side interface controller 7; and disk side interface controllers 8. The buffer 5 has a previous data memory 13 and a previous parity data memory 14. The host interface controller 11 of the host computer 1 is connected to the host side interface controller 7 through a host interface 16. The computer system further comprises a group of disk units 3, each of which is connected to corresponding one of the disk side interface controllers 8 in the array controller 2 through a disk interface 17.

Figure 2:
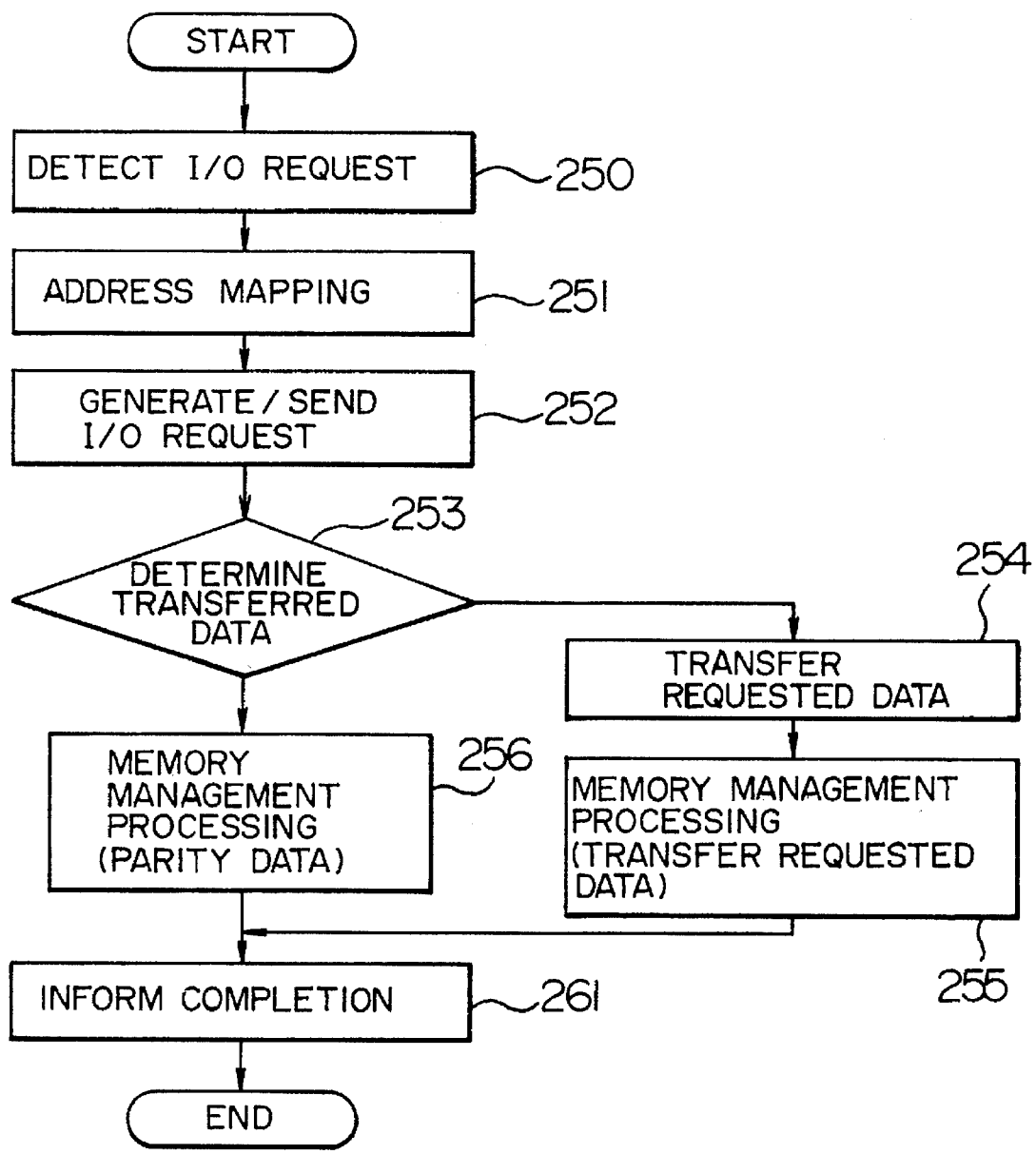
FIG. 2 is an explanatory diagram showing a read processing flow according to the first embodiment of the present invention.
Figure 3:
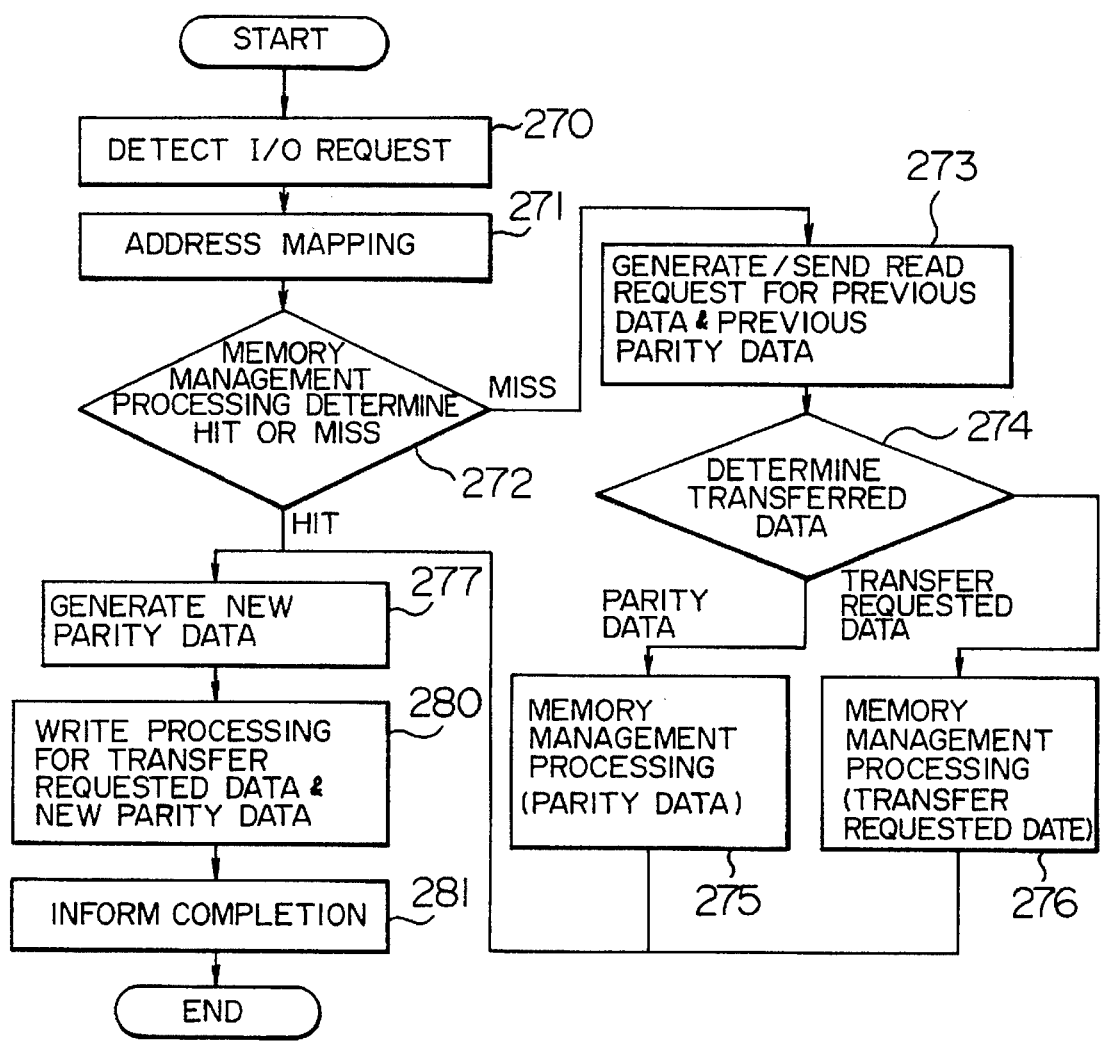
FIG. 3 is an explanatory diagram showing a write processing flow according to the first embodiment of the present invention.

FIG. 2 shows a control processing flow executed in the array controller 2 when it detects a read request from the host computer 1; FIG. 3 shows a control processing flow executed in the array controller 2 when it detects a write request from the host computer 1; and FIG. 4 shows a memory management flow in the control processing flow executed when a write request is detected.

The operations of the read processing will be first explained with reference to FIG. 2. When the host computer 1 sends a data read request to the array disk, the data read request is sent from the host computer 1 to the array controller 2 through the host interface controller 11, host interface 16, and host side interface controller 7 [processing step (250)]. In the array controller 2, the main controller 4 executes mapping, instructed by the data read request transferred thereto, for finding where transfer requested data is stored in the disk unit group 3 and also for finding where parity data corresponding to the transfer requested data is stored in the disk unit group 3 [processing step (251)], generates a data read request to target disk units thus found, and sends this data read request to the target disk units 3 through the disk side interface controller 8 and the disk interfaces 17 [processing step (252)]. Then, data transferred from the disk unit group 3 to the array controller 2 is determined by the main controller 4 whether it is transfer requested data or parity data [processing step (253)]. The transfer requested data, if so determined, is transferred to the host computer 1 through the buffer 5 [processing step (254)], and simultaneously stored into the previous data memory 13 in the buffer 5 by the memory management processing [processing step (255)]. Likewise, the parity data is stored into the previous parity data memory 14 in the buffer 5 by the memory management processing [processing step (256)]. Next, the main controller 4, upon detecting the completion of the data transfer by the disk units 3, informs the host computer 1 of the data transfer and transfer completion, thus terminating the read processing [processing step (261)].

Next, the operations of the write processing will be explained with reference to FIG. 3. When the host computer 1 sends a data write request to the array disk, the data write request is sent from the host computer 1 to the array controller 2 through the host interface controller 11, host interface 16 and host side interface controller 7 [processing step (270)]. In the array controller 2, the main controller 4 executes mapping, instructed by the data write request transferred thereto, for finding where transfer requested data and parity data corresponding to the transfer requested data are stored in the disk unit group 3 [processing step (271)]. The main controller 4 further searches the previous data memory 13 and the previous parity data memory 14 for the transfer requested data and the parity data corresponding to the transfer requested data to determine whether the data have already been stored in the memories 13, 14 [processing step (272)]. When previous data and previous parity data corresponding to write requested data are found by the search/determination processing at this processing step (272), new parity data is generated from the transfer requested data from the host computer 1 and the above-mentioned previous data and previous parity data [processing step (277)]. Next, the main controller 4 writes the transfer requested data and the new parity data into a target disk unit 3 based on the mapping information detected or generated at processing step (271) [processing step (280)]. Further, the main controller 4, upon detecting the completion of the data transfer, informs the host computer 1 of the completion of the data transfer, thus terminating the write processing [processing step (281)].

On the other hand, if neither previous data nor previous parity data corresponding to the transfer requested data is found in the previous data memory 13 and the previous parity data memory 14, respectively, by the search/determination processing at processing step (272), the main controller 4 generates and sends a data read request to the disk unit group 3 which contains previous data and previous parity data corresponding to the transfer requested data, based on the mapping information detected or generated by the mapping at processing step (271) [processing step (273)]. Data transferred from the disk unit group 3 to the array controller 2 is determined whether it is transfer requested data or parity data, similarly to the above-mentioned read processing [processing step (274)], and transfer requested data, if so determined, is stored into the previous data memory 13 [processing step (275)] while parity data is stored into the previous parity data memory 14 [processing step (276)]. Afterward, the processing flow proceeds to the above-mentioned processing step (277), followed by the execution of similar processing to that described above.

The foregoing processing procedure enables previous data and previous parity data to be read for updating parity data without accessing the disk unit group 3, whereby faster update processing can be achieved independently of the disk access capability of the system.

The previous data memory 13 and the previous parity data memory 14 are managed by the memory management processing executed by the main controller 4. Specifically, the main controller 4 has a memory management table 18 for storing, as parameters, a data file name; data size; number of updates; open date; priority; stored address information and priority in the memories 13, 14; and so on, as shown in FIG. 5, and erases, adds or deletes data stored in the memories 13, 14 in accordance with the flow as shown in FIG. 4, based on information contained in the memory management table 18. The main controller 4 also performs setting, deletion and so on of the information contained in the memory management table 18 so as to manage the memories 13, 14. Incidentally, it is desirable that setting and updating of information in the memory management table as described above can also be executed by instructions from the host computer 1.

Also, in this embodiment, when the host computer 1 sends a data read request, the sent data read request causes the above-mentioned memory management processing to also find or determine whether or not transfer requested data and parity data corresponding to the transfer requested data have been stored in the previous data memory 13 and the previous parity data memory 14, and if relevant data exist in the memories 13, 14, they can be immediately transferred from the memories 13, 14 to the host computer 1, whereby faster data read processing can also be realized.

It is desirable herein that the processing for reading transfer requested data, generated when the host computer 1 sends a data read request, should be executed asynchronously with the processing for reading parity data corresponding to this transfer requested data. It is also desirable that the parity data read processing should be executed when no access request from the host computer 1 to the array disk is in a waiting state.

It is further desirable that the processing for writing transfer requested data, generated when the host computer 1 sends a data write request, should also be executed asynchronously with the processing for writing parity data corresponding to this transfer requested data, and that the parity data write processing should be executed when no access request from the host computer 1 to the array disk is in a waiting state. In this embodiment, the above-mentioned read/write processing on transfer requested data and the same processing on parity data are executed asynchronously under the control of the main controller 4 in the array controller 4.

Again, it is desirable that the previous data memory 13 and the previous parity data memory 14 are composed of non-volatile memories such as battery backed-up RAM, EEPROM (Electrically Erasable ROM), or the like (the same applies also to respective embodiments which will be described below). While the capacity of each of the memories 13, 14 is desirably more or less 1/10 the total capacity of the disk unit group 3, it is not limited to this particular value.

Figure 6:
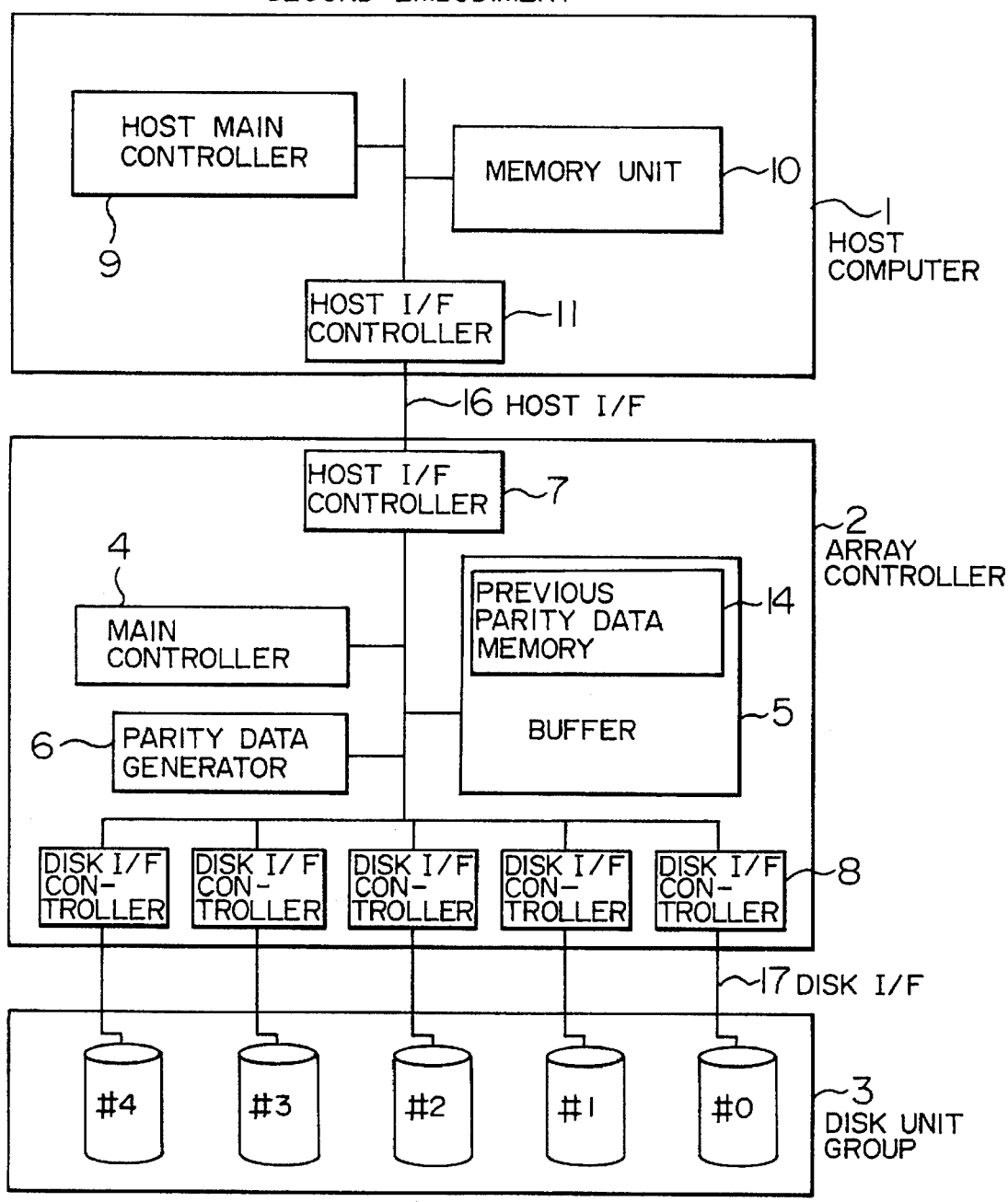
FIG. 6 is a block diagram showing a computer system according to a second embodiment of the present invention.

FIG. 6 shows in block diagram form a computer system employing an array disk as an external storage device according to a second embodiment of the present invention. The second embodiment differs from the first embodiment shown in FIG. 1 in the configuration of the buffer.

Specifically, while the computer system shown in FIG. 1 has the previous data memory 13 and the previous parity data memory 14 in the buffer 5, the computer system of this embodiment only has the previous parity data memory 14 in the buffer 5. With this configuration, previous data is stored in the buffer 5, while previous parity data is stored in the previous parity data memory 14.

In this embodiment, when the host computer 1 sends a data read/write request to the array disk, previous data is stored in the buffer 5. Therefore, when the parity data is to be updated, the previous data is read from the buffer 5. Except for this operation, the parity data update is executed by similar processing performed by the computer system shown in FIG. 1.

With the foregoing configuration, data write processing accompanying a parity data update can be executed without reading previous parity data from a disk unit, whereby the multiple processing performance can be improved in the array disk.

It should be noted that while in this embodiment, parity data update information is generated by the parity data generator 6, a separate means may be provided for generating such parity data update information. Also, while the parity data update information is assumed to be stored in the previous parity data memory 14, a separate memory may be provided for storing the parity data update information.

Figure 7:
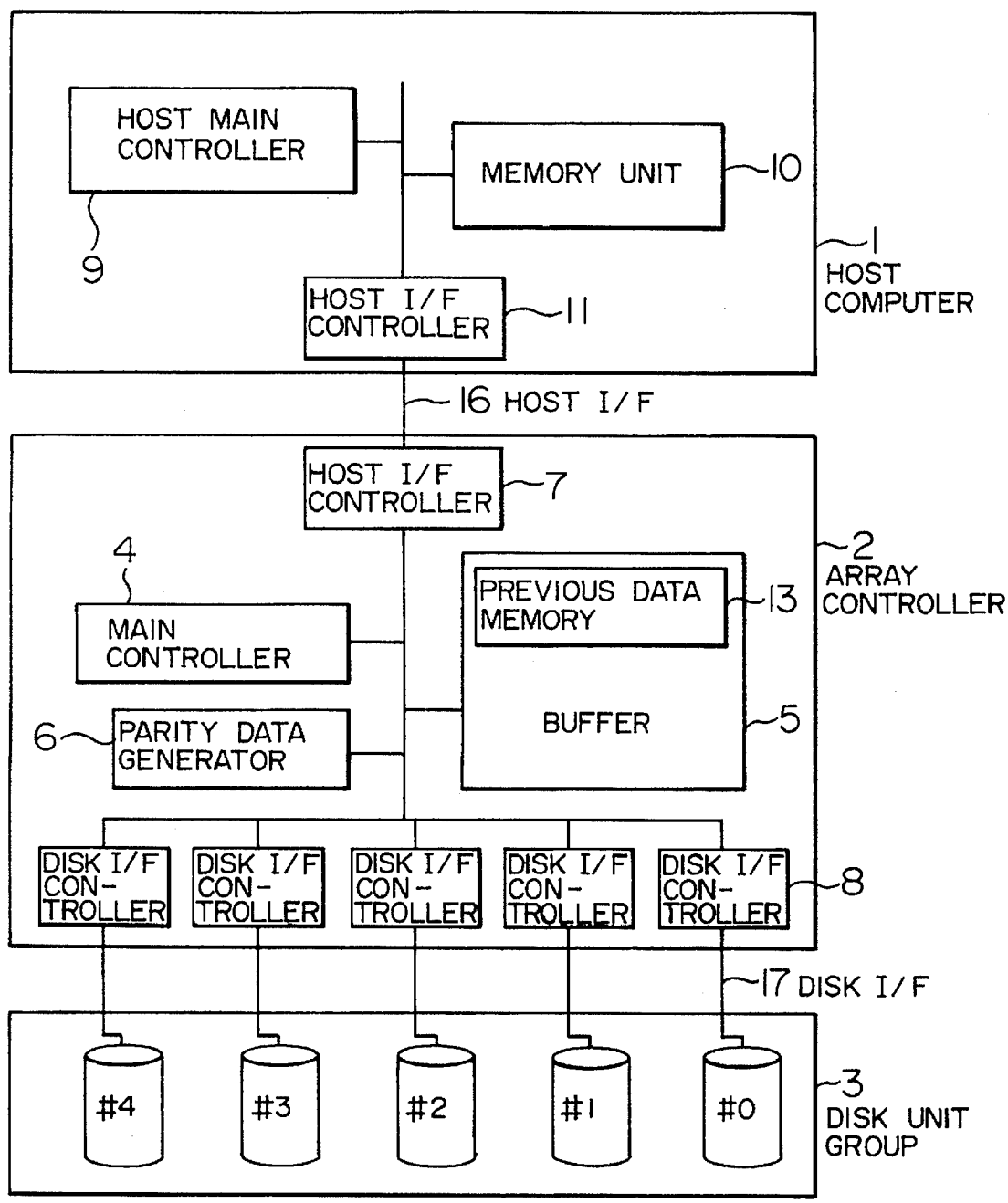
FIG. 7 is a block diagram showing a computer system according to a third embodiment of the present invention.

FIG. 7 shows in block diagram form a computer system employing an array disk as an external storage device according to a third embodiment of the present invention, which differs from the computer systems shown in the block diagrams of FIGS. 1 and 2 in the configuration of the buffer.

Specifically, the configuration shown in FIG. 7 differs from the computer systems shown in the block diagrams of FIGS. 1 and 6 in that a previous data memory only is provided in the buffer 5. In the processing, this embodiment differs from the aforementioned embodiments in the following:

when a data read request is sent from the host computer 1, data transferred from the disk unit group 3 to the array controller 2 is transferred to the host computer 1 through the buffer 5, and is simultaneously stored in the previous data memory 13 by the memory management processing; and when previous data corresponding to write requested data is found in the previous data memory 13, parity data update information is generated from transfer requested data from the host computer 1 and the previous data. The rest of the processing is executed similarly to the computer systems shown in FIGS. 1 and 6.

With the foregoing processing system, the data write processing requiring a parity data update is executed such that the disk unit which contains previous parity data and a disk unit which contains data can be accessed asynchronously, thus enabling the multiple processing performance of the array type disk system to be improved.

Figure 8:
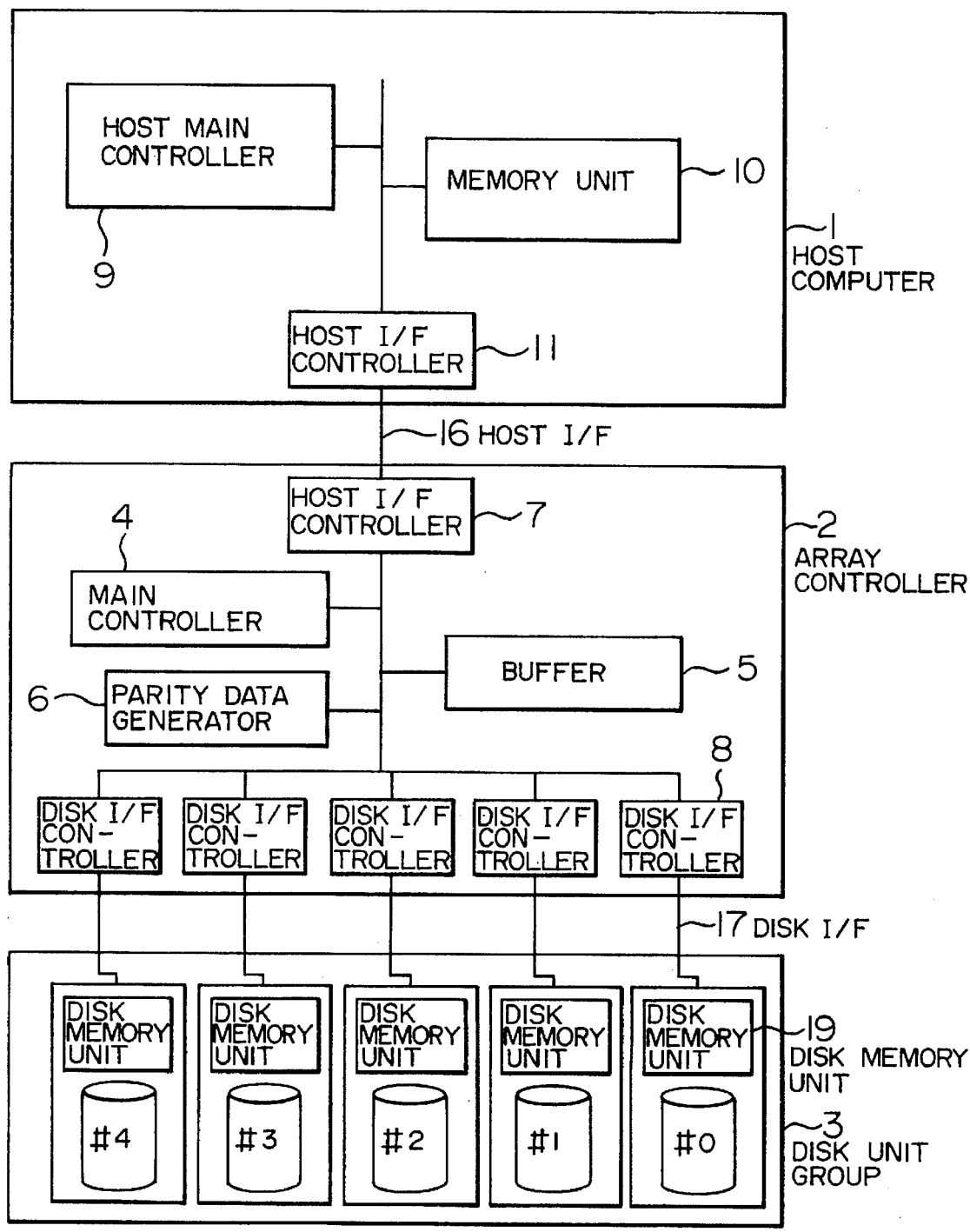
FIG. 8 is a a block diagram showing a computer system according to a fourth embodiment of the present invention.

FIG. 8 shows in block diagram form a computer system employing an array disk as an external storage device according to a fourth embodiment of the present invention. This embodiment differs from the first-third embodiments in that the buffer 5 and each of the individual disk units 3 have a memory unit 19 which is managed as a single unit or a plurality of divided regions, where the memory unit 19 is composed, for example, non-volatile memory elements.

In this embodiment, when the host computer 1 sends a data read request to the array disk, the main controller 4 in the array controller 2 executes mapping, instructed by the data read request transferred thereto, for finding where transfer requested data and parity data corresponding to this transfer requested data are stored in the disk unit group 3. The main controller 4 next generates and sends a data read request to a disk unit 3 which has been found as a disk unit containing the transfer requested data as well as generates and sends a request to a disk unit 3, found as a disk unit containing parity data corresponding to the transfer requested data, for reading the parity data and storing the same into its own memory unit 19. With these requests, management information for the memory unit 19 is generated and updated in the disk unit 3 containing the parity data. The transfer requested data transferred from the disk unit 3 to the array controller 2 is again transferred to the host computer 1 through the buffer 5. The main controller 4, upon detecting the completion of the data transfer from the disk unit 3, informs the host computer 1 of the data transfer and transfer completion, thus terminating the read processing.

On the other hand, when the host computer 1 sends a data write request to the array disk, the main controller 4 in the array controller 2 executes mapping, instructed by the data write request transferred thereto, for finding where transfer requested data and parity data corresponding to this transfer requested data are stored in the disk unit group 3, generates a data read request for reading previous data and previous parity data, and sends the data read request to a disk unit 3, based on mapping information detected or generated in the mapping. The disk unit 3, responsive to the data read request from the array controller 2, retrieves relevant data from the memory unit 19 thereof and transfers the data to the array controller 2. Thereafter, new parity data is generated in the array controller 2 and written into the disk unit 3 together with the transfer requested data, similarly to the foregoing embodiments.

It will be appreciated that the foregoing processing system enables data to be transferred from a disk unit without operating mechanical portions of the disk unit, thereby increasing the speed of the data transfer.

Incidentally, it is desirable that the host computer 1 is also allowed to generate and update the management information for the memory unit 19 in the disk unit 3.

Figure 9:
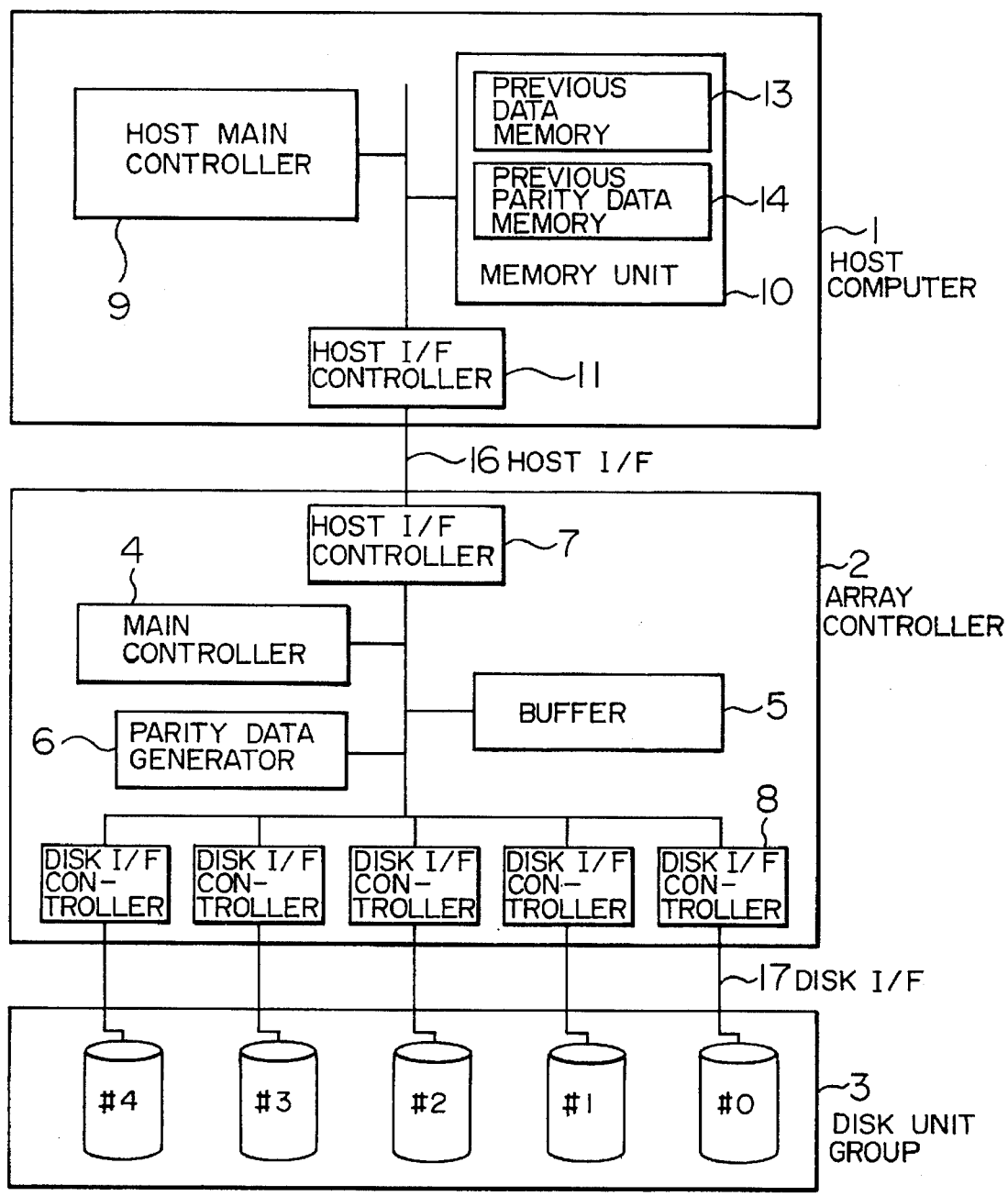
FIG. 9 is a a block diagram showing a computer system according to a fifth embodiment of the present invention.

FIG. 9 shows in block diagram form a computer system employing an array disk as an external storage device according to a fifth embodiment of the present invention, which significantly differs from the first–fourth embodiments in that the host computer 1 is provided with a memory unit 10 which comprises a previous data memory 13 and a previous parity data memory 14 for caching previous data and previous parity data, respectively.

The host computer 1 in this embodiment has a function of dividing data to rearrange it in a striping size; a function of mapping striping data to disk units; and a function of generating parity data from striping data, all of which are executed by the array controller 2 in the respective embodiments described above. Thus, the host computer 1 stores data arranged in the striping size and parity data into an array disk as one or a plurality of files and manages the stored data. While these functions are supposed to be similar to those of the array controller 2 in the aforementioned respective embodiments, any means may be utilized for this purpose as long as it has minimally required functions such as a function of mapping individual data in data files and parity data files to physical addresses on disk units 3 based on instructions from the host computer 1.

In this embodiment, when the host computer 1 sends a data read request to the array disk, the host computer 1 first executes mapping for finding where transfer requested data and parity data corresponding to this transfer requested data are stored in the disk unit group 3, generates a read request for reading the transfer requested data and the parity data corresponding thereto, which are treated as separate files or a single file, and sends the read request to the array disk. The array controller 2 executes mapping for finding individual data corresponding to the transfer request (file read request) using physical addresses of the disk unit group 3, generates and sends a data read request to a target disk unit 3, and transfers data read from the disk unit 3 to the host computer 1, followed by the termination of the read processing.

The host computer 1 continues the processing using the transfer requested data transferred thereto from the disk unit 3 through the array controller 2 by the read request, and simultaneously stores the transferred data (transfer requested data and parity data corresponding to this transfer requested data) into the previous data memory 13 and the previous parity data memory 14, respectively. The host computer 1 further generates and manages history information on respective data stored in the previous data memory 13 and the previous parity data memory 14.

On the other hand, when the host computer 1 sends a data write request to the array disk, the host computer 1 searches the previous data memory 13 and the previous parity data memory 14 to find where transfer requested data and party data corresponding to this transfer requested data are stored in the memories 13, 14, and executes mapping for finding where the respective data have been stored in the disk unit group 3. When previous data and previous parity data corresponding to write requested data (or the transfer requested data) are retrieved respectively from the previous data memory 13 and the previous parity data memory 14 in the search, the host computer 1 generates new parity data from the transfer requested data, the previous data, and the previous parity data, and also generates a write request for writing the transfer requested data and the new parity data as separate files or a single file, based on mapping information detected or generated by the mapping. The write request is then sent to the array disk.

If previous data and previous parity data corresponding to the transfer requested data are not found in the previous data memory 13 and the previous parity data memory 14, respectively, the host computer 1 generates and sends a data read request through the array controller 2 to disk units 3 which contain the transfer requested data, and previous data and previous parity data corresponding to this transfer requested data, based on the mapping information detected or generated in the above-mentioned mapping. Such data, when transferred from the disk unit group 3 to the host computer 1 through the array controller 2, is determined to be transfer requested data or parity data, as is the case of the read processing. Transfer requested data, if so determined, is stored in the previous data memory 13, while parity data is stored in the previous parity data memory 14.

Afterward, processing such as generation and update of new parity data and so on is executed as is the case of the aforementioned data read processing.

It will be appreciated that the processing procedures as described above allow a computer system, which has a host computer additionally perform array control, to read previous data and previous parity data, during a parity data update, without accessing disk units, and accordingly to speed up the parity data update processing.

Also, in this embodiment, when a data read is requested from the host computer 1, the host computer 1 may find in its own memory management processing whether or not transfer requested data and parity data corresponding to this transfer requested data have been stored in the previous data memory 13 and the previous parity data memory 14, and such data can be immediately retrieved from the data memories 13, 14 if they are contained therein, which further leads to faster data read processing.

Figure 10:
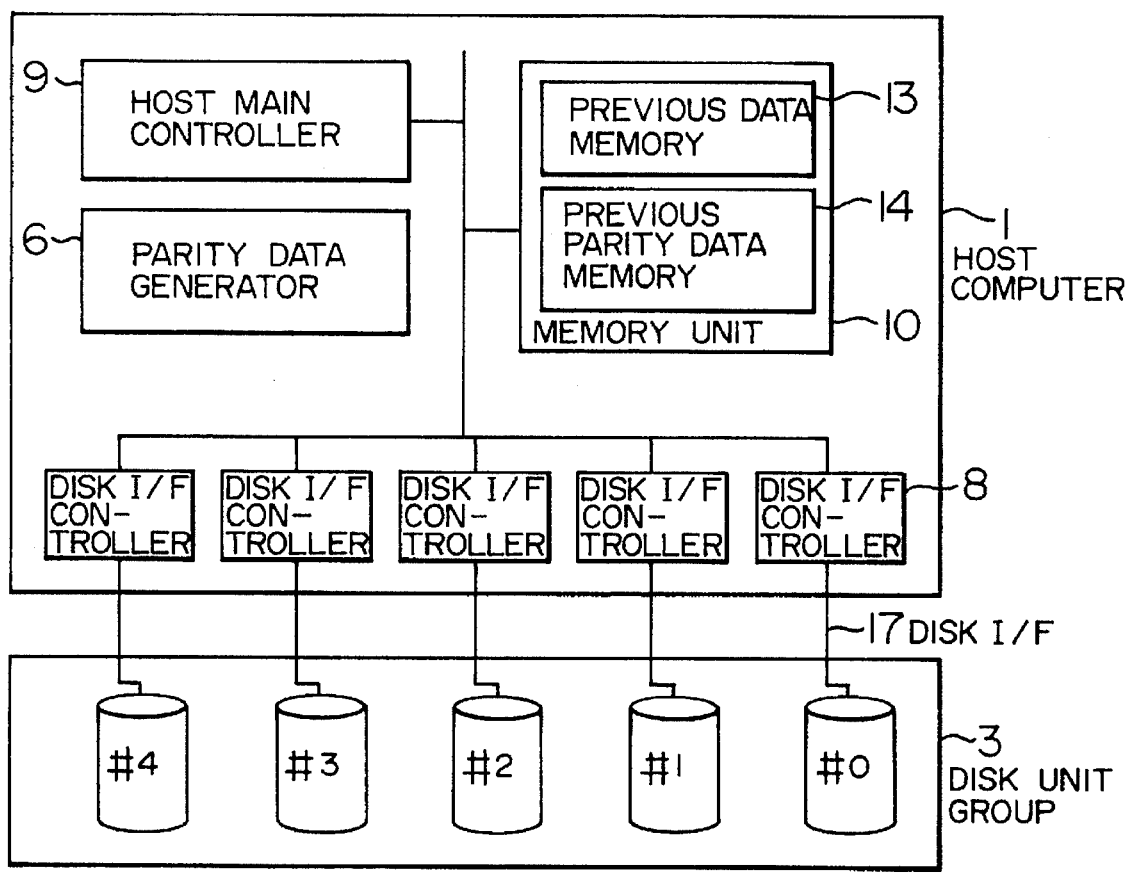
FIG. 10 is a a block diagram showing a computer system according to a sixth embodiment of the present invention.

FIG. 10 shows in block diagram form a computer system employing an array disk as an external storage device according to a fifth embodiment of the present invention, wherein a host computer is constructed to cache transfer requested data and parity data corresponding to this transfer requested data, similarly to the fifth embodiment.

In FIG. 10, a host computer 1 comprises a host main controller 9; a memory unit 10; a parity data generator 6; and disk side interface controllers 8. The memory unit 10 is formed of a previous data memory 13 and a previous parity data memory 14. A disk unit group 3 has a plurality of disk units which are parallelly connected to the respective disk interface controllers 8 through disk interface units 17.

The host computer 1 of this embodiment also has the functions executed by the array controller 2 in the aforementioned embodiments, i.e., the function of dividing data to rearrange it in a striping size; the function of mapping striping data to disk units; and the function of generating parity data from striping data. Thus, the host computer 1 is constructed to store data arranged in the striping size and parity data into an array disk as one or a plurality of files and manage the stored data.

This embodiment features that the host computer 1 directly manages data in the striping size equal to the unit storing size employed in the disk unit group 3, so as to make the array controller unnecessary. A processing flow for data transfer is similarly progressed except that the host computer 1 executes the mapping instead of the array controller 2 in the fifth embodiment.

According to the present invention as described above, upon detecting a data read request from the host computer, the array controller can find transfer requested data and parity data corresponding to this transfer requested data in the disk unit group. Also, by sending a data read request for reading both the data from the disk unit group, they can be stored and managed in the memories provided in the array controller.

The array controller, upon detecting a data write request from the host computer, searches its memories for transfer requested data and parity data corresponding to this transfer requested data based on data write request information and memory management information. If both the data are found in the memories, the array controller may send a read request for reading the data from the memories to obtain previous data and parity data corresponding to this previous data, and generate new parity data from both the found data and the transfer requested data.

In other words, since new parity data can be generated without accessing the disk unit group, faster parity data update processing is achieved.

The array controller can also generate and update management information on the memories, which serve as temporary storing regions for the read data, and has information on access history, priority, and so on of data stored in the memories, so that the memories are expected to be optimally utilized.

Further, since parity data in a disk unit can be updated at an arbitrary timing asynchronously with an update of transfer requested data, it is possible to prevent the performance of multiple processing from being degraded, which has conventionally occurred when data is written into an array disk.

Data stored in the memories of the array controller may be held after the completion of a data write request from the host computer, such that the memories can be searched for the data when a data read request from the host computer is detected. Therefore, if data relevant to a data read request sent from the host computer is found in the memories, a read request for transfer requested data may be sent to the memories to enable the read requested data to be transferred without accessing the disk unit, whereby faster read processing is also expected.

While in this embodiment, the previous data memory and the previous parity data memory are provided for storing transfer requested data and parity data corresponding to the transfer requested data, respectively, the memory configuration is not limited to this, and alternatively, a configuration similar to that of the second embodiment provided only with the previous parity data memory for storing parity data corresponding to the transfer requested data or a configuration similar to that of the third embodiment provided only with the previous data memory for storing the transfer requested data, for example, may be substituted therefor without incurring any problem. Also, in this embodiment, the previous data memory 13 and/or the previous parity data memory 14 may be part of the main memory region in the host computer 1.

Although the above-mentioned first–sixth embodiments take an example of storing all or part of previous data, previous parity data and parity data update information into corresponding memories such as the previous data memory 13, previous parity data memory 14 and previous data update information memory, information to be stored is not limited to them. For example, when transfer requested data, instructed by the host computer to be written, and/or parity data corresponding to the transfer requested data are stored in a disk unit, it is also possible to store in the memories address mapping information found at the aforementioned process step 271 or the like, i.e., information on the disk unit, associated address information, and so on.

In this case, when transfer requested data from the host computer 1 is written into an arbitrary disk unit based on the address mapping information, the address mapping information and at least information indicating that parity data corresponding to the address has not been updated may be stored in the memories.

The array controller, when executing parity data update processing, may use the address mapping information and the information indicating that the parity data has not been updated to detect a parity data storing region which has not been updated, and newly generate parity data from all data which shares the same parity data. It goes without saying that after the completion of the parity data generation and update processing, the address mapping information and the information indicating that the parity data has not been updated are deleted, or at least the information indicating that the parity data has not been updated is overwritten by information indicating that the parity data has been updated.

According to this embodiment, since the amount of data to be stored in the memories can be apparently reduced as compared with the foregoing embodiments, not only reduction in size of the memories or improved efficiency is expected, but a further cost reduction is achieved.

We claim:

1. A disk array system which allows a plurality of host computers to access a disk array having a plurality of disk units, said disk array responsive to an access request from one of said host computers to access said plurality of disk units through a plurality of disk interfaces, said disk array having disk unit control means for controlling said disk array such that said disk units are regarded as one or a plurality of disk units from said host computers, wherein an access to said disk array is realized for each of the disk units with data divided to be rearranged in an access unit of an arbitrary size called a striping size, and data to be accessed by said host computer and parity data generated from said data are stored in said disk units so as to improve the integrity of data in case a trouble occurs in said disk units, said disk array having, as a constituent thereof, an array controller comprising:

means responsive to detection of a data read request from said host computer for generating a data read request and sending the same to one or a plurality of disk units which contains transfer requested data and parity data corresponding to said transfer requested data;

means for transferring said transfer requested data to said host computer;

a previous data memory for storing said transfer requested data and said parity data corresponding thereto as previous data;

means for generating and managing management information such as access history information and/or address information of data stored in said previous data memory;

means for executing deletion, update and so on of data stored in said previous data memory based on said management information;

means responsive to detection of a data write request from said host computer for finding previous data and previous parity data corresponding to the transfer requested data from said previous data memory;

means for generating new parity data from said previous data and previous parity data, and new data transferred from said host computer to the previous data memory where it is stored; and means for storing said new data and new parity data into said one or plurality of disk units, wherein processing for reading previous data from said disk unit in order to generate new parity data is made unnecessary, when said host computer sends a write request for writing updated data, the new parity data being stored into said one or plurality of disk units asynchronously with a timing at which the new data is stored.

2. A disk array system which allows a plurality of host computers to access a disk array having a plurality of disk units, said disk array, responsive to an access request from one of said host computers, to access said plurality of disk units through a plurality of disk interfaces, said disk array having disk unit control means for controlling said disk array such that said disk units are regarded as one or a plurality of disk units from said host computers, wherein an access to said disk array is realized for each of the disk units with data divided to be rearranged in an access unit of an arbitrary size called a striping size, and data to be accessed by said host computer and parity data generated from said data are stored in said disk units so as to improve the integrity of data in case a trouble occurs in said disk units, said disk array having, as a constituent thereof, an array controller comprising:

means responsive to detection of a data read request from said host computer for generating a data read request and sending the same to one or a plurality of disk units containing transfer requested data and parity data corresponding to said transfer requested data;

means for transferring said transfer requested data to said host computer;

a previous data memory for storing said parity data corresponding to said transfer requested data as previous parity data;

means for generating and managing management information such as access history information and/or address information of data stored in said previous data memory;

means for executing deletion, update and so on of data stored in said previous data memory based on said management information;

means responsive to detection of a data write request from said host computer for finding previous parity data corresponding to transfer requested data from said previous data memory;

means for generating new parity data from said previous parity data found in said previous data memory and new data transferred from said host computer to the previous data memory where it is stored; and means for storing said new data and new parity data into said one or plurality of disk units, wherein new parity data is generated by using previous parity data stored in said previous data memory when a data write request from said host computer is detected, thereby making it unnecessary to perform read processing on a disk unit containing previous parity data for reading the previous parity data used to generate new parity data, when said array controller detects a data write request from said host computer, the new parity data being stored into said one or plurality of disk units asynchronously with a time when the new data is stored.

3. A disk array system which allows a plurality of host computers to access a disk array having a plurality of disk units, said disk array responsive to an access request from one of said host computers to access said plurality of disk units through a plurality of disk interfaces, said disk array having disk unit control means for controlling said disk array such that said disk units are regarded as one or a plurality of disk units from said host computers, wherein an access to said disk array is realized for each of the disk units with data divided to be rearranged in an access unit of an arbitrary size called a striping size, and data to be accessed by said host computer and parity data generated from said data are stored in said disk units so as to improve the integrity of data in case a trouble occurs in said disk units, said disk array having, as a constituent thereof, an array controller comprising:

means responsive to detection of a data read request from said host computer for generating a data read request and sending the same to one or a plurality of disk units which contains transfer requested data;

means for transferring said transfer requested data to said host computer;

a previous data memory for storing said transfer requested data as previous data;

means for generating and managing management information such as access history information and/or address information of data stored in said previous data memory;

means for executing deletion, update and so on of data stored in said previous data memory based on said management information;

means responsive to detection of a data write request from said host computer for finding previous data corresponding to transfer requested data in said previous data memory;

means for generating parity data update information from previous data found in said previous data memory and new data transferred from said host computer and stored in the previous data memory;

an update information memory for storing said parity data update information;

means for generating new parity data from said parity data update information and previous parity data stored in said disk unit; and means for storing said new data and new parity data into said one or plurality of disk units, wherein processing for reading previous data from said disk unit in order to generate new parity data is made unnecessary, when said host computer sends a write request for writing updated data, processing for generating and storing the new parity data being performed asynchronously with a time when the new data is stored.

4. A disk array system which allows a plurality of host computers to access a disk array having a plurality of disk units, said disk array responsive to an access request from one of said host computers to access said plurality of disk units through a plurality of disk interfaces, said disk array having disk unit control means for controlling said disk array such that said disk units are regarded as one or a plurality of disk units from said host computers, wherein an access to said disk array is realized for each of the disk units with data divided to be rearranged in an access unit of an arbitrary size called a striping size, and data to be accessed by said host computer and parity data generated from said data are stored in said disk units so as to improve the integrity of data in case a trouble occurs in said disk units, said disk array having, as a constituent thereof, an array controller comprising means responsive to detection of a data read request from said host computer for generating a read request and sending the same to one or a plurality of disk units which contains transfer requested data, and for sending a read request requiring no data transfer to a disk unit which contains parity data; and said disk units each having a previous data memory which is managed as a single unit or as a plurality of divided regions;

means for storing requested data into said previous data memory when it detects said read request requiring no data transfer, in a similar manner to the case of detecting a read request requiring data transfer; and means for generating and managing management information on said previous data memory, wherein, upon detecting a write request from said host computer, a data read request generated and sent to said disk units to read previous data and/or previous parity data therefrom is realized by data transfer between said array controller and/or said previous data memory of said disk units, said previous data and previous parity data being stored the previous data memory asynchronously with the write request.

5. A disk array system according to claim 4, wherein:

said host computer can also set and update said management information on said previous data memory which is managed as a single unit or as a plurality of divided regions in each of said disk units.

6. A disk array system which allows a plurality of host computers to access a disk array having a plurality of disk units, said disk array responsive to an access request from one of said host computers to access said plurality of disk units through a plurality of disk interfaces, each of said host computers having means for dividing data to rearrange the data in an arbitrary size called a striping size, means for mapping this data in the striping size to said disk units, and means for generating parity data from said data in the striping size, said data managed in the striping size and parity data being stored in said array disk as one or a plurality of files, said array disk mapping transfer requested data from said host computer to physical addresses of said disk units, wherein:

means responsive to a data read request for finding parity data corresponding to transfer requested data and for generating and sending a read request for reading the transfer requested data and/or the parity data corresponding thereto as separate files or a single file;

a previous data memory for storing the transfer requested data read by said read request;

means for generating and managing management information such as history information and/or address information on data stored in said previous data memory;

means for deleting and updating data stored in said previous data memory based on said management information;

means responsive to a data write request for finding previous data, corresponding to the transfer requested data and previous parity data, from said previous data memory, the previous parity data being stored in the previous data memory;

means for generating new parity data from said previous data, previous parity data and transfer requested data; and means for storing said transfer requested data and said new parity data into said disk array as one or a plurality of files, wherein the processing for reading previous data from said disk units, required for generating new parity data in said disk array, is made unnecessary when a write request is generated from said host computer; and wherein the disk array is controlled by software executed in the host computers so that a part of a main memory region of said host computer is used as a cache.

7. A disk array system according to claim 6, wherein:

said plurality of disk units or a interface controller of disk units are directly connected to a system bus of said host computer having a plurality of disk interfaces in parallel.

8. A disk array system according to claim 1, further comprising means for storing transfer requested data and/or newly generated parity data into said previous data memory, so that processing for reading data from the disk units is made unnecessary when the same data is again requested to be read or written.

9. A disk array system according to claim 1, wherein:

when a data read request from said host computer is detected, a read request is also generated and sent for reading parity data corresponding to transfer requested data.

10. A disk array system according to claim 1, wherein:

said host computer is also allowed to set and update said management information on said previous data memory and said parity data update information memory.

11. A disk array system according to claim 1, further comprising:

means responsive to detection of a data request from said host computer for executing the processing for reading transfer requested data asynchronously with the processing for reading parity data corresponding to said transfer requested data and for storing and managing said parity data.

12. An information processing system including a host computer and a plurality of disk units, wherein:

said host computer constituting the information processing system has an array controller for controlling said plurality of disk units as one or plural disk units, said array controller having means for dividing data in an access unit, where data is divided in an arbitrary size called a striping size, and for rebuilding the data from said striping size data in order to realize accesses to said disk units in the striping size access unit; and means for mapping said striping size data to said disk units, said information processing system storing data accessed by said host computer and parity data generated from said data into said disk units so as to improve the integrity of data when a fault occurs in said disk units, said array controller in said host computer constituting said information processing system comprises:

means for finding address information including information on one or a plurality of disk units and addresses for storing transfer requested data and parity data corresponding to said transfer requested data, when a data read request is generated from said host computer; means for generating a read request using said address information and sending said read request to said one or plurality of disks; a previous data memory for holding parity data corresponding to transfer requested data read by said read request as previous parity data; means for generating and managing management information including said address information on data held in said previous data memory and historical management information; and means for performing deletion, update and so on to the data held in said previous data memory, and said array controller further comprises:

means for finding address information including information on one or a plurality of disk units and addresses for storing transfer requested data and parity data corresponding to said transfer requested data, when a data write request is generated from said host computer; means for finding previous parity data corresponding to said transfer requested data from said previous data memory; means for newly generating parity data using at least said previous data retrieved from said previous data memory and said transfer requested data; and means for storing said transfer requested data and new parity data into said one or plurality of disk units based on said management information, the transfer requested data being stored into the one or plurality of disk units at a time which is asynchronous with a time the new parity data is stored, wherein previous parity data stored in said previous data memory is used to newly generate parity data, when a data write request is generated from said host computer, to make it unnecessary to execute read processing for a disk unit in which previous parity data is stored, said read processing being otherwise required to newly generate parity date.

13. An information processing system including a host computer and a plurality of disk units, wherein:

said host computer constituting the information processing system has an array controller for controlling said plurality of disk units as one or plural disk units, said array controller having means for dividing data in an access unit, where data is divided in an arbitrary size called a striping size and for rebuilding the data from said striping-size data in order to realize accesses to said disk units in the striping size access unit; and means for mapping said striping-size data to said disk units, said information processing system storing data accessed by said host computer and parity data generated from said data into said disk units to improve the integrity of data when a fault occurs in said disk units, said array controller in said host computer constituting said information processing system comprises:

means for finding address information including information on one or a plurality of disk units and addresses for storing at least transfer requested data, when a data read request is generated from said host computer; means for generating a read request using said address information and sending said read request to said one or plurality of disk units; a previous data memory for holding transfer requested data read by said read request as previous data; means for generating and managing management information including address information on data held in said previous data memory and historical management information; and means for performing deletion, update and so on to data held in said previous data memory based on said management information, and said array controller further comprises:

means for finding address information including information on one or a plurality of disk units and addressed for storing transfer requested data and parity data corresponding to said transfer requested data, when a data write request is generated from said host computer; means for finding previous data corresponding to said transfer requested data from said previous data memory; means for generating parity data update information using previous data retrieved from said previous data memory and the transfer requested data of said host computer, the transfer requested data being stored in the previous data memory; update information memory for holding said parity data update information; and means for storing said transfer requested data and new parity data into said one or plurality of disk units based on said management information, wherein previous data stored in said previous data memory and transfer requested data are used to generate and hold the parity data update information, when a data write request is generated from said host computer, and said parity data update information and previous parity data are used to newly generate parity data, so as to make it unnecessary to execute read processing for a disk unit in which previous parity data is stored, said read processing being otherwise required to newly generate parity data, the new parity data being stored into said one or plurality of disk units asynchronously with a timing at which the transfer requested data is stored.

14. A disk array system according to claim 1, further comprising:

means for finding address mapping information including information on one or a plurality of disk units and addresses for storing transfer requested data and parity data corresponding to said transfer requested data, when a data write request is generated from said host computer;

means for writing the transfer requested data from said host computer into an arbitrary disk unit based on said address mapping information;

a memory for storing said address mapping information and at least information indicating that parity data corresponding to the transfer requested data stored in said disk unit has not been updated;

means for finding a parity data storing region which has not been updated, using said address mapping information and said information indicating that the parity data has not been updated, when parity data update processing is executed;

means for finding all regions in which data sharing said parity data are stored; and means for newly generating parity data from all the data sharing said parity data.

15. An information processing system according to claim 12, further comprising:

means for finding address mapping information including information on one or a plurality of disk units and addresses for storing transfer requested data and parity data corresponding to said transfer requested data, when a data write request is generated from said host computer;

means for writing the transfer requested data from said host computer into an arbitrary disk unit based on said address mapping information;

a memory for storing said address mapping information and at least information indicating that parity data corresponding to the transfer requested data stored in said disk unit has not been updated;

means for finding a parity data storing region which has not been updated, using said address mapping information and said information indicating that the parity data has not been updated, when parity data update processing is executed;

means for finding all regions in which data sharing said parity data are stored; and means for newly generating parity data from all the data sharing said parity data.

16. An information processing system according to claim 15, wherein after parity data has been newly generated or updated, said at least information indicating that the parity data has not been updated, stored in said memory, is overwritten by information indicating that said information has been updated.

17. A disk array system according to claim 6, wherein at least part of the main memory region of said host computer is used as a memory region for storing said previous data and so on.

18. An information processing system according to claim 12, wherein at least part of a main memory region of said host computer is used as a memory region for storing said previous data and so on.

19. A disk array system according to claim 1, wherein said previous data memory is composed of non-volatile elements.

20. An information processing system according to claim 12, wherein said previous data memory is composed of non-volatile elements.

21. An information processing system according to claim 12, further comprising means for storing transfer requested data and/or newly generated parity data into said previous data memory, so that processing for reading data from the disk units is made unnecessary when the same data is again requested to be read or written.

* * * * *